United States Patent Office 3,048,556
Patented Aug. 7, 1962

3,048,556
ION EXCHANGE TREATMENT OF BUTYL RUBBER LATEX AND PRODUCT THEREOF
Alfred L. Miller, Cranford, N.J., assignor to Esso Research and Engineering Company, a corporation of Delaware
No Drawing. Filed Apr. 21, 1959, Ser. No. 807,765
9 Claims. (Cl. 260—29.7)

This invention relates to improved carboxylate soap free rubber latices of high viscosity containing a dissolved emulsification admixture of at least one organic sulfate salt containing about 0 to about 20 ethylene oxide units in combination with a minor proportion, based on said sulfate salt, of at least one alkali metal dihydrogen phosphate and/or sodium hydrogen sulfate or the like. More particularly, the present invention relates to a process for increasing the viscosity of a rubber emulsion or latex, preferably butyl rubber latex, without the addition of thickening agents commonly used for this purpose by treatment of said latex with a cation exchange resin. By the process of the present invention, it has been found that by increasing the viscosity of the rubber latex, the coating process characteristics of said latex are improved particularly as to amount picked up in processes such as dipping, doctor blade coating, roll coating, and impregnation of porous substrates and similar impregnatable or coatable articles.

The discovery of the present invention is particularly surprising in that similar treatment with cation exchange resins of rubber latices normally prepared with carboxylate soaps, coagulate and become unusable as latex materials.

A typical butyl rubber latex desirably increased in viscosity with cation exchange resins in accordance with the present invention, comprises about 100 parts by weight of butyl rubber dissolved to form a 5 to 35, preferably a 10 to 30 weight percent solution in a solvent, dispersed in about 1 to 5,000, preferably about 5 to 3,000 parts by weight of water containing about 1 to 20 p.h.r. (parts by weight per 100 parts by weight of rubber) of an emulsifier having the general formula:

$$R(OCH_2CH_2)_nOSO_3M$$

where R is a $C_1$ to $C_{24}$ alkyl, aryl, aralkyl, alkaryl, or cycloalkyl group, $n$ is 0 to 20, preferably about 8 to 18, and M is a divalent or preferably a monovalent metal, and about 0.1 to 5 p.h.r., preferably about 0.25 to 2.0 p.h.r. (parts by weight per 100 parts by weight of rubber) of a stabilizing agent which is a monovalent salt of an ortho phosphate such as sodium dihydrogen phosphate, and/or sodium hydrogen sulfate or the like.

Butyl rubber is a copolymer of a $C_4$ to $C_8$ isoolefin with a $C_4$ to $C_{14}$ multiolefin prepared at low temperatures with a dissolved Friedel-Crafts catalyst. The major component of the copolymer is preferably isobutylene, 2-methyl-1-butene, 3-ethyl-1-pentene, etc. The minor component is preferably a multiolefin having from 4 to 10 or 12 carbon atoms. Advantageous multiolefins are butadiene, isoprene, piperylene, dimethallyl, myrcene, alloocimene and the like. Of these materials, isoprene is regarded as the most suitable multiolefin. The isoolefin and the multiolefin are mixed in the ratio of a major proportion of isobutylene and a minor proportion of isoprene, the preferred range being 0.5 to 15.0 parts isoprene and 99.5 to 85.0 parts isobutylene. High purity is desirable in both materials and it is preferable to use an isobutylene of at least 99% purity, although satisfactory copolymers can be made of materials of considerably lower purity. The mixture of monomers is cooled to a temperature within the range of between about −10° or −40° C. and −180° C. the preferred range being between about −60° C. and −110° C. The material may be cooled by the use of a refrigerating jacket upon the mixing tank and polymerizer, in which case any refrigerant, such as a $C_1$ to $C_3$ alkyl halide, which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane and liquid ethylene are satisfactory. In some instances, liquid methane may be employed, although usually the temperature of boiling liquid methane is undesirably low.

The cold mixture is then polymerized by the addition of a Friedel-Crafts catalyst, preferably in a liquid or dissolved form. Ordinarily an amount of catalyst ranging from about 0.05 to 20%, preferably about 0.15 to about 1.0% of the weight of the mixed olefins is required to polymerize them into a high molecular weight polymer. A partial copolymerization may be obtained by limiting the quantity of catalyst added.

In the polymerization reaction, the liquid catalyst may be sprayed on to the surface of the rapidly stirred, cold olefinic material, or a small high pressured stream of catalyst may be directed into the body of the rapidly stirred mixture. In both processes powerful and efficient stirring is needed to disperse the catalyst into the mixture.

The polymerization proceeds rapidly to a yield of the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol, or some other compound, to inactivate the catalyst. The warm water serves the purpose of flashing off the excess refrigerant, the unpolymerized olefins and catalyst solvent. The polymer is then recovered from the water suspension in any conventional manner, such as straining or filtering, or otherwise as may be convenient. The polymer is then dried either as a blanket passing through a tunnel drier or on a mill.

The product is a plastic and elastic material. It has a Staudinger molecular weight within the range between about 35,000 and 150,000, the minimum useful molecular weight being about 20,000 and the preferred range between about 45,000 and 80,000. The rubber generally has a Wijs iodine number between about 1 and 20, and a maximum iodine number of about 50, the preferred iodine number being about 2 to 15. The rubber materials may contain pigments, reinforcing agents, softeners, vulcanizers, accelerators, anti-oxidants, or other compounding ingredients.

In order to produce a latex to be treated with a cation exchange resin in accordance with the present invention, a rubbery copolymer, preferably butyl rubber, is dissolved in a hydrocarbon solvent to form a solution or cement, advantageously an aliphatic hydrocarbon containing about 4 or 6 to 8 or 10 carbon atoms (e.g., hexane). The hydrocarbon solution is then emulsified in the presence of water in which the emulsifying agents have been previously dissolved.

To perform this emulsification, mechanical work must be supplied to break down the hydrocarbon solution of rubber into particles which are colloidal in size. This mechanical action is aided to a considerable extent by the character of the emulsifier system described above in that it reduces the surface tension between the cement and water phases and in that such emulsifiers afford satisfactory protection from colloidal particles agglomerating with other particles to form larger particles, or coagulum. Machines commonly employed to supply this mechanical action include high speed stirrers such as a Dispersator, high shear producing machines such as colloid mills, high pressure homogenizers and shear producers by sound energy such as the Rapisonic and/or Minisonic Homogenizers, etc.

Typical emulsifiers which may be used in accordance with the present invention include, among others, organic anionic sulfates preferably containing at least one ethylene oxide unit. For instance, suitable emulsifiers include the sodium salt of sulfated nonylphenoxypolyethoxyethanol, the potassium salt of sulfated nonylphenoxypolyethoxyethanol, the sodium salt of sulfated tridecoxypolyethoxyethanol, the lithium salt or potassium salt of sulfated duodecoxypolyethoxyethanol, ammonium or amine salts of sulfated nonylphenoxy (tridecoxy and/or duodecoxy) polyethoxyethanol, sodium lauryl sulfate, ammonium lauryl sulfate, sodium tridecyl sulfate, ammonium tridecyl sulfate, mixtures thereof, etc.

The addition of small quantities of an orthophosphate stabilizer salt, that is, about 0.20 to about 2.5 p.h.r., improves the stability of the latex emulsion, particularly with respect to the processing stability. The effect of the stabilizing agent is not merely additive, since when used alone, it will not produce a stable emulsion. It is preferred that the stabilizer be used in an amount between about 0.5 and about 2.0 p.h.r., and it is especially desirable to use about 1.0 to 1.5 p.h.r. of the orthophosphate salt.

The emulsion may be prepared, for example, in a Minisonic Homogenizer having a funnel, gear pump, bell, recycle line, rubber cement injection line and a mixer. The funnel may be charged with water containing the emulsifier or emulsifier-stabilizer mixture. The aqueous solution may be recycled by means of a gear pump for about 0.1 to 20 minutes. During this operation, the liquid is advantageously pumped through an orifice and sprayed over the edge of a reed in the bell. It returns to the funnel by means of a recycle line. After about 1 minute or so of recycling, the rubber cement, which is generally a hydrocarbon solution containing about 5 to 35% by weight butyl rubber, may be introduced to the homogenizer through a line which terminates just above the gears of the pump. The coarse emulsion formed in the pump may then be sprayed through an orifice on the edge of a reed and converted into a fine emulsion by the sonic cavitation produced by the vibrating reed. The emulsion may be recycled for about 0.5 to 30 minutes, generally about 1.0 to 15.0 minutes, before it is withdrawn from the homogenizer and stripped of the hydrocarbon solvent.

The stripping operation may be carried out at elevated temperatures of say about 50° to 100° C. and atmospheric pressure until no more solvent can be removed. If a higher solids latex is desired, vacuum stripping of water may be employed. Because foaming may occur during this step in a process, the latex is sometimes diluted with stripped or partly stripped latex, or an antifoaming agent, such as Dow Anti-Foam A Emulsion, which is a poly-silicone oil, may be added just prior to the solvent removal step.

The amount of water contained in the emulsion is not critical as long as there is enough water present to produce a stable water aqueous emulsion. Accordingly, therefore, for shipping purposes, the most desirable form of emulsion is a concentrated emulsion. The water may be increased at the time of application by adding whatever water is desired to provide a good working consistency.

In practicing the present invention, about 100 parts by weight of a rubber latex, preferably a butyl rubber latex such as described above, are treated at a temperature of 10° to 90° C. (room temperature being satisfactory) with about 1 to 20 parts by weight or more, advantageously about 2 to 15 parts by weight and preferably about 4 to 10 parts by weight of an activated cation exchange resin. The treatment may be accomplished in a number of manners. For instance, the resin may be added to the latex and the mixture stirred for a time sufficient for substantially all of the ion exchange to take place, and may subsequently be removed by filtration. Alternatively, the latex may be contacted with the ion exchange resin in a fixed bed by passing the latex through a tower containing the resin. Another method resides in the immersion of a confined mass of the resin into the latex wherein the resin is enclosed in a wire basket or other perforated containing means of such a structure that the latex may readily permeate within the containing means but the resin does not escape therefrom. By this means, after ion exchange, the resin is removed from the latex simply by removing the container. Obviously other expedients will occur to those skilled in the art, the particular method of contacting the cation exchange resin with the rubber latex not being a critical portion of the present invention.

In order to activate the cation exchange resin, the resin is washed at least one time with sufficient quantities of dilute acid such as dilute sulfuric acid (e.g., 5% by weight) for a time sufficient to fully activate the ion exchange resin. Normally, the amount of dilute acid employed will be about 0.5 to 100 volumes per volume of cation exchange resin, the activation times generally varying from about 0.5 to 200, preferably about 5.0 to 100 minutes at temperatures of say between about 10 and 90° C. Residual acid solution and soluble products of activation are removed by excess water washing until these washings have the same pH as that of the wash water. Obviously, after use in ion exchange treatment, the cation exchange resin must be reactivated before reuse. This may be conventionally performed by rinsing residual latex from the resin with an excess of water, the cation exchange resin then being ready to be reactivated by contact with dilute acid followed by washing as described above.

Suitable cation exchange resins, useful for the purposes of the present invention, include among others, Dowex 50 consisting of small spherically shaped beads composed of a sulfonated polystyrene divinylbenzene cross-linked resin and Permutit Q composed of a sulfonated polystyrene resin in spherical bead form.

In order to more fully illustrate but not to limit the present invention, the following experimental data are given:

EXAMPLE

The following method was used to prepare a latex. 100 parts by weight of an isobutylene-isoprene butyl rubber copolymer having a Mooney viscosity at 212° F. for 8 minutes of 75, a mole percent unsaturation of 1.7 and a viscosity average molecular weight of 485,000, dissolved in hexane (20% by weight), were dispersed in about 250 cc. of water containing 5 p.h.r. (parts per 100 of rubber) of the sodium salt of sulfated nonyl-phenoxypolyethoxyethanol which contained an average of four ethylene oxide units per molecule and 1 p.h.r. of sodium dihydrogen phosphate. This mixture was emulsified in a Rapisonic Homogenizer and was then stripped of hexane at a temperature of 90° C. and atmospheric pressure. Water was subsequently removed by distillation at a temperature of 77° C. and 6 lbs./sq. in. pressure absolute to result in a butyl rubber latex having a total solids content of 55% and a pH of 5.7, the Brookfield viscosity in centipoises at a 6 r.p.m. spindle speed (model LVF) being 1720 centipoises at room temperature.

100 grams of the above butyl rubber latex were stirred for 5 minutes at room temperature in the presence of 6.6 grams of the cation exchange resin known as Dowex 50X–4 which is a strongly acidic cation exchanger of the nuclear sulfonic type polystyrene cross-linked with divinylbenzene. After this period of stirring, the resin was removed by filtration through several layers of cheese cloth at which time the resin removal was substantially complete. The pH, as measured by a glass electrode, was found to be 1.7, the viscosity having increased from 1720 centipoises to 3,000 centipoises at room temperature. Since at such a low pH of 1.7, the commercial usefulness of the latex would be somewhat limited, samples were contacted with concentrated ammonium hydroxide in accordance with the following table resulting in the following pH's and viscosities:

*Table* pH RAISED BY CONCENTRATED NH4OH ADDITION

| pH: | Viscosity in c.p.s. |
|---|---|
| 1.7 (control) | 3000 |
| 7.0 | 3050 |
| 9.5 | 3150 |

The above data show that butyl rubber latex may be advantageously raised in viscosity without the necessity of conventional viscosity increasing additives solely by treatment with a typical cation exchange resin. The data further show that the pH of the final latex may be varied over a very wide range (e.g., 1.7 to 9.5) by the optional addition to the high viscosity latex of ammonium hydroxide or say a suitable amine such as triethanolamine without any change in the desirable high resulting viscosity. It was also noted that no instability or coagulum had developed as a result of this treatment.

Resort may be had to modifications and variations of the disclosed embodiments without departing from the spirit of the invention or the scope of the appended claims.

What is claimed is:

1. A process for increasing the viscosity of $C_4$ to $C_8$ isoolefin-$C_4$ to $C_{12}$ multiolefin butyl rubber latices which comprises contacting said latex at a temperature level of between about 10° and 90° C. with between about 1 and 20 parts by weight of a synthetic sulfonated styrene divinyl benzene cation exchange resin per 100 parts by weight of latex and separating the cation exchange resin treated latex from the resin.

2. The process according to claim 1 in which the initial viscosity at room temperature before treatment of the latex is between about 1500 and 2000 centipoises, the viscosity of the cation exchange resin treated latex being between about 2500 and 4000 centipoises.

3. The process according to claim 1 in which the butyl rubber is an isobutylene-isoprene butyl rubber.

4. The process according to claim 1 in which the latex is contacted with the resin for a sufficient time to increase the viscosity of the latex at room temperature to at least 2,500 centipoises.

5. A butyl rubber latex prepared in accordance with the process of claim 1.

6. The latex according to claim 5 in which there is present an emulsifier comprising an organic anionic sulfate salt.

7. The latex according to claim 5 also containing a stabilizing amount of an alkali metal dihydrogen phosphate.

8. The latex according to claim 6 also containing a stabilizing amount of sodium dihydrogen phosphate.

9. The latex according to claim 8 having a pH of between about 1 and 10.

References Cited in the file of this patent

UNITED STATES PATENTS

| 2,580,325 | Scott et al. | Dec. 25, 1951 |
| 2,799,662 | Ernst et al. | July 16, 1957 |
| 2,858,281 | Bauman | Oct. 28, 1958 |
| 2,859,190 | Cubberley | Nov. 4, 1958 |
| 2,936,295 | Brodkey et al. | May 10, 1960 |
| 2,955,094 | Brodkey et al. | Oct. 4, 1960 |

FOREIGN PATENTS

| 719,315 | Great Britain | Dec. 1, 1954 |

OTHER REFERENCES

Kunin: "Ion Exchange Resins," John Wiley & Sons, Inc. (2nd edition), New York City (1958), page 8.